United States Patent
Zhu et al.

(10) Patent No.: US 11,250,596 B2
(45) Date of Patent: Feb. 15, 2022

(54) COMPUTER PROGRAM PRODUCT WITH FEATURE COMPRESSION ALGORITHM BASED ON NEURAL NETWORK

(71) Applicant: Tiandy Technologies CO., LTD., Tianjin (CN)

(72) Inventors: Jianli Zhu, Tianjin (CN); Lin Dai, Tianjin (CN); Chao Xue, Tianjin (CN); Qingxin Li, Tianjin (CN); Rujie Wang, Tianjin (CN); Zhibao Wang, Tianjin (CN); Zhe Wang, Tianjin (CN)

(73) Assignee: Tiandy Technologies CO., LTD., Tianjin (CN)

( * ) Notice: Subject to any disclaimer, the term of this patent is extended or adjusted under 35 U.S.C. 154(b) by 78 days.

(21) Appl. No.: 16/851,081

(22) Filed: Apr. 16, 2020

(65) Prior Publication Data
US 2021/0192794 A1    Jun. 24, 2021

(30) Foreign Application Priority Data
Dec. 18, 2019  (CN) .......................... 201911309635.9

(51) Int. Cl.
G06T 9/00    (2006.01)
G06K 9/00    (2022.01)
G06K 9/62    (2022.01)

(52) U.S. Cl.
CPC .......... G06T 9/002 (2013.01); G06K 9/00281 (2013.01); G06K 9/6256 (2013.01)

(58) Field of Classification Search
None
See application file for complete search history.

(56) References Cited

U.S. PATENT DOCUMENTS

| | | | | |
|---|---|---|---|---|
| 6,671,391 | B1 * | 12/2003 | Zhang | G06K 9/00228 382/118 |
| 10,943,096 | B2 * | 3/2021 | Yi | G06K 9/00288 |
| 2003/0235332 | A1 * | 12/2003 | Moustafa | G06K 9/3208 382/157 |
| 2015/0347820 | A1 * | 12/2015 | Yin | G06N 3/0454 382/118 |
| 2018/0341851 | A1 * | 11/2018 | Chung | G06N 3/082 |
| 2019/0108621 | A1 * | 4/2019 | Condorovici | G06K 9/66 |
| 2020/0019759 | A1 * | 1/2020 | Savchenko | G06N 3/0454 |
| 2020/0184278 | A1 * | 6/2020 | Zadeh | G06F 16/953 |
| 2021/0019503 | A1 * | 1/2021 | Zheng | G06K 9/00221 |

* cited by examiner

*Primary Examiner* — Anand P Bhatnagar
(74) *Attorney, Agent, or Firm* — JCIP Global Inc.

(57) ABSTRACT

The disclosure provides a feature compression algorithm based on neural network, including the following steps: S1, image data preparation: collecting facial images, and uniformly performing map processing to the facial images collected; S2, feature data acquisition: delivering the facial images processed into a face recognition system for face detection and feature extraction, and saving facial feature data; S3, setting up a neural network model; S4, model iteration training; S5, storing a parameter model; and S6, feature compression. The feature compression algorithm based on neural network of the disclosure can not only achieve compression of original feature data, but also retain its original semantic feature, which belongs to a higher-dimensional feature abstraction. The compressed feature data can be directly used.

5 Claims, 2 Drawing Sheets

COMPUTER PROGRAM PRODUCT WITH FEATURE COMPRESSION ALGORITHM BASED ON NEURAL NETWORK

CROSS-REFERENCE TO RELATED APPLICATION

This application claims the priority benefit of China application serial no. 201911309635.9, filed on Dec. 18, 2019. The entirety of the above-mentioned patent application is hereby incorporated by reference herein and made a part of this specification.

TECHNICAL FIELD

The disclosure belongs to the field of feature compression algorithms, and particularly relates to a feature compression algorithm based on neural network.

BACKGROUND OF THE PRESENT INVENTION

Data compression refers to a technical method to reduce data size so as to reduce storage space and improve the efficiency of transmission, storage and processing without losing useful information, or to reorganize data according to a certain algorithm to reduce the redundancy and save space of data. Data compression includes lossy compression and lossless compression. The feature compression algorithm is a form of data compression, which mainly studies how to express original data with less data size and higher feature density.

At present, there are mainly three feature compression algorithms. The first algorithm is to replace a high-precision data type with a low-precision data type so as to reduce the space occupied by original feature data. However, this algorithm in essence is not used to really compress the feature data, but implemented from the perspective of computer storage. The second algorithm is to extract main data component information from the original feature data through a dimensionality reduction manner such as PCA (Principal Component Analysis) so as to substantially express information of the original data using low-dimension data, which belongs to lossy compression. The third algorithm is to perform feature data compression through a common data compression algorithm; however, the result data compressed by using this algorithm cannot be directly used, because the compressed data has no semantic of the original feature data, and must be used after decompression.

SUMMARY OF PRESENT INVENTION

Aiming at the defects in the prior art, an objective of the disclosure is to provide a feature compression algorithm based on neural network.

In order to achieve the objective, the technical solution of the disclosure is achieved as follows:

Provided is a feature compression algorithm based on neural network, comprising the following steps:

S1, image data preparation: collecting facial images, and uniformly performing map processing to the facial images collected;

S2, feature data acquisition: delivering the facial images processed into a face recognition system for face detection and feature extraction, and saving facial feature data;

S3, setting up a neural network model;

S4, model iteration training;

S5, saving a parameter model; and

S6, feature compression.

Further, a quantity of the facial images in step S1 is more than ten thousand; each of the facial images has one and only one face; and for the map processing in step S1, a size of map is 1080p.

Further, the neural network model in step S3 comprises a hidden layer having a node number being less than a node number of an input layer; and an input feature vector of the neural network model is the facial feature data.

Further, the model iteration training in step S4 adopts an own coding training method; and the own coding training method particularly comprises the following steps:

S401, compressing information x of the input layer to the hidden layer to obtain h;

S402, generating x' using the h of the hidden layer;

S403, comparing the generated x' with the x of the input layer to obtain a prediction error;

S404, performing reverse delivery of the error, and gradually improving an accuracy of feature compression; and S405, obtaining data h in a middle hidden layer after convergence of the training, and h is a higher-dimensional more-abstract feature vector of x.

Further, the parameter model from x of the input layer to h of the hidden layer of the trained network is only saved, and quantified by a Haisi quantization tool.

Further, feature data x to be compressed in step S6 is forwardly propagated from the input layer through the saved model to obtain h which is a compressed feature.

Relative to the prior art, the disclosure has the following advantages:

The neural network model can extract higher-dimensional information expression of the original data. Hence, such algorithm can not only achieve compression of the original feature data, but also retain its original semantic features, and belongs to a higher-dimensional feature abstraction. The compressed feature data can be used directly.

DESCRIPTION OF THE DRAWINGS

Drawings constituting a portion of the disclosure are provided for further understanding of the disclosure. The illustrative examples and illustration of the disclosure are used for explaining the disclosure, which does not constitute an improper limitation of the disclosure. In the drawings.

DETAILED DESCRIPTION OF PREFERRED EMBODIMENTS

Figure 1:
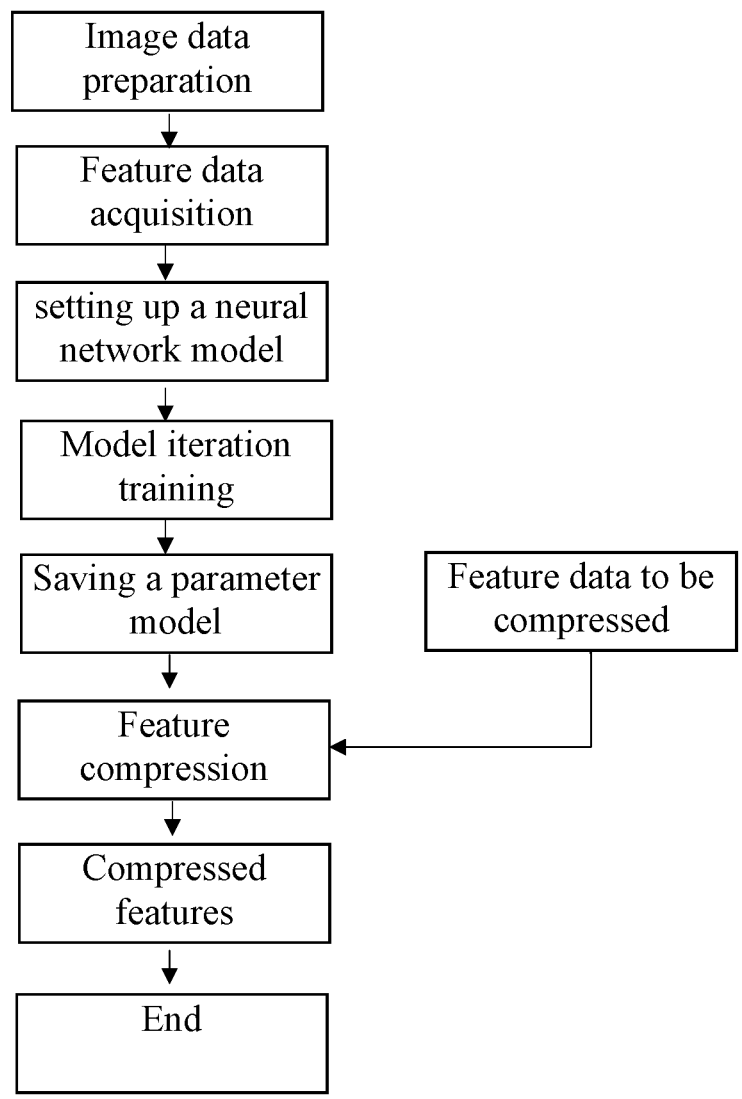
FIG. 1 is a flowchart of a feature compression algorithm based on neural network according to an embodiment of the disclosure.

It is noted that embodiments of the disclosure and features in the embodiments can be mutually combined without conflict.

In the description of the disclosure, it should be understood that orientation or position relationship indicated by the terms "center", "longitudinal", "transverse", "top", "bottom", "front", "rear", "left", "right", "vertical", "horizontal", "top", "bottom", "inside" and "outside" is based on the orientation or position relationship shown in the drawings, and is only for convenience of describing the disclosure and simplifying the description but not indicating or implying the device or element must have a specific orientation and be constructed and operated in a specific orientation, and therefore cannot be understood as a limitation of the disclosure. In addition, terms "first", "second" and the like are only used for description purposes and cannot be understood as indicating or implying relative importance or implying the number of indicated technical features. Thus, features defined as "first", "second" and the like may explicitly or implicitly include one or more of such features. In the description of the disclosure, unless otherwise specified, "a plurality of" means two or more.

In the description of the disclosure, it should be noted that unless otherwise specified and defined, terms "installation", "connection" and "link" should be understood in a broad sense, for example, it can be fixed connection, detachable connection or integrally connection; mechanical connection, or electrical connection; direct connection, indirect connection via intermediate media, or internal communication of two components. For those of ordinary skill in the art, the specific meanings of the above terms in the disclosure can be understood through specific circumstances.

The disclosure will be described in detail with reference to the drawings and in combination with embodiments in the following.

Figure 2:
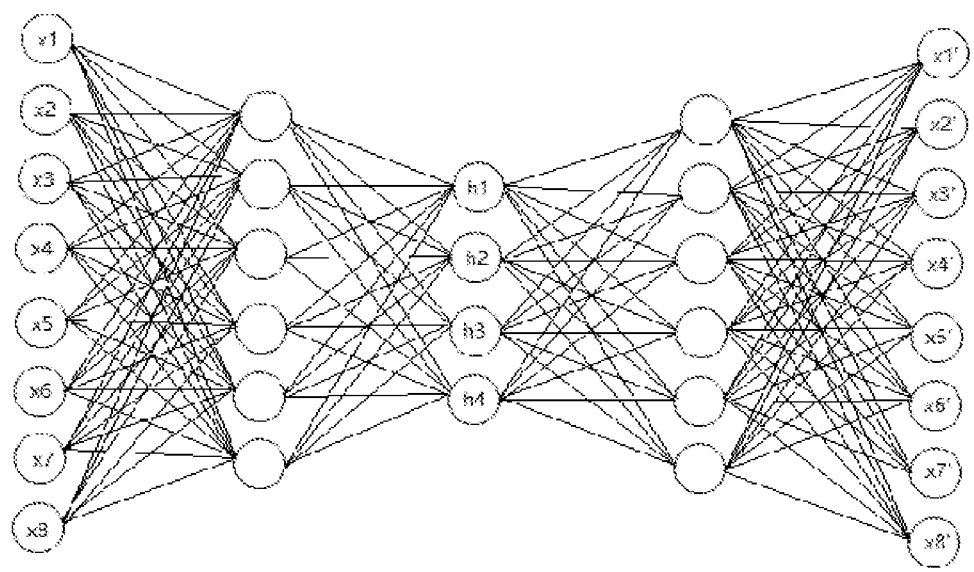
FIG. 2 is a structural diagram of a neural network according to an embodiment of the disclosure.

A feature compression algorithm based on neural network, as shown in FIG. 1, comprises the following steps:

S1, image data preparation: collecting a large amount (ten thousand above) of facial images, wherein each of the facial images has one and only one face; and uniformly performing map processing to the facial images collected, wherein a size of map is 1080p and images having a size larger than 1080p can be removed;

S2, feature data acquisition: delivering the processed facial images into a face recognition system for face detection and feature extraction, and saving the extracted facial feature data;

S3, setting up a neural network model, wherein a full-connection neural network is set up, it is noted that the neural network may be any neural network in other forms, but must contain a hidden layer having a node number being less than a node number of an input layer, the input of the neural network is the facial feature data, many hidden layers are in the middle, and the structure diagram is as shown in FIG. 2, wherein x1, x2, x3 . . . are input feature vectors, x1', x2', x3' . . . are output vectors;

S4, training, wherein the training of this network adopts an own coding training form, information x of the input layer is compressed to the hidden layer to obtain h, then x' is generated using the h of the hidden layer, the generated x' is compared with the x of the input layer to obtain a prediction error, then reverse delivery of error is performed, and subsequently, the accuracy of feature compression is gradually improved, the data h obtained in the middle hidden layer after convergence of training is essence of source data feature, namely, a higher-dimensional more-abstract feature vector of x;

S5, saving the model, wherein the parameter model from x of the input layer to h of the hidden layer of the trained neural network is only saved, and quantified by a Haisi quantization tool;

S6, feature compression, wherein feature data x to be compressed in step S6 is forwardly propagated from the input layer through the saved model to obtain h which is a compressed feature and may be directly applied to a facial comparison algorithm, thereby greatly improving the comparison efficiency.

The disclosure is provided for solving the problems in the existing feature compression algorithm, the objective of which is to compress the feature data to the greatest extent, and the compressed data has original feature semantics and may greatly improve the efficiency of the face comparison algorithm in face recognition.

The above descriptions are only preferred embodiments of the disclosure but not intended to limit the disclosure. Any modification, equivalent replacement, improvement and the like made within the spirit and principle of the disclosure shall be included in the protective scope of the disclosure.

What is claimed is:

1. A computer program product comprising a non-transitory computer readable medium encoded with an information processing program for use in an information processing device, the program when executed performs the following steps:
   S1, image data preparation: collecting facial images, and uniformly performing map processing to the facial images collected;
   S2, feature data acquisition: delivering the facial images processed into a face recognition system for face detection and feature extraction, and saving facial feature data;
   S3, setting up a neural network model for inputting the facial feature data;
   S4, model iteration training: adopting an own coding training method;
   S5, saving a parameter model of the neural network model; and
   S6, feature compression: obtaining a compressed feature through the saved parameter model,
   wherein the own coding training method particularly comprises the following steps:
   S401, compressing information x of an input layer to a hidden layer to obtain h;
   S402, generating x' using the h of the hidden layer;
   S403, comparing the generated x' with the x of the input layer to obtain a prediction error;
   S404, performing reverse delivery of the prediction error, and gradually improving an accuracy of feature compression; and
   S405, obtaining data of the h in the hidden layer after convergence of the training, the h being a higher-dimensional more-abstract feature vector of the x.

2. The computer program product according to claim 1, wherein a quantity of the facial images in step S1 is more than ten thousand; each of the facial images has one and only one face; and for the map processing in step S1, a size of map is 1030p.

3. The computer program product according to claim 1, wherein the neural network model in step S3 comprises a hidden layer having a node number being less than a node number of an input layer; and an input feature vector of the neural network model is the facial feature data.

4. The computer program product according to claim 1, wherein the parameter model from the x of the input layer to the h of the hidden layer of the trained neural network is only saved in step S5, and quantified by a Haisi quantization tool.

5. The computer program product according to claim 1, wherein feature data x to be compressed in step S6 is forwardly propagated from the input layer through the saved parameter model to obtain h which is the compressed feature.

* * * * *